United States Patent
Ohno et al.

(10) Patent No.: US 6,819,029 B2
(45) Date of Patent: Nov. 16, 2004

(54) VIBRATION WAVE DRIVING APPARATUS

(75) Inventors: Yuuji Ohno, Tokyo (JP); Kenjiro Takemura, Tokyo (JP); Takashi Maeno, Kanagawa (JP); Nobuyuki Kojima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 10/091,510

(22) Filed: Mar. 7, 2002

(65) Prior Publication Data
US 2002/0145363 A1 Oct. 10, 2002

(30) Foreign Application Priority Data
Mar. 12, 2001 (JP) .................................. 2001/068432

(51) Int. Cl.$^7$ .............................................. H01L 41/09
(52) U.S. Cl. .............................. 310/323.17; 310/323.03
(58) Field of Search ....................... 310/323.01–323.03, 310/323.17, 323.13–323.14, 317, 328

(56) References Cited

U.S. PATENT DOCUMENTS

| | | |
|---|---|---|
| 5,128,580 A | 7/1992 | Maeno et al. |
| 5,155,407 A | 10/1992 | Kimura et al. |
| 5,274,295 A | 12/1993 | Tsukimoto et al. |
| 5,298,829 A | 3/1994 | Tsukimoto et al. |
| 5,436,522 A | 7/1995 | Tsukimoto et al. |
| 5,585,685 A | 12/1996 | Maeno et al. |
| 5,646,469 A | 7/1997 | Tsukimoto et al. |
| 5,739,621 A | 4/1998 | Atsuta et al. |
| 5,760,528 A * | 6/1998 | Tomikawa ............. 310/323.02 |
| 5,770,916 A | 6/1998 | Ezaki et al. |
| 5,917,268 A * | 6/1999 | Takagi ................... 310/323.02 |
| 6,051,911 A | 4/2000 | Kojima et al. |
| 6,191,520 B1 | 2/2001 | Maruyama et al. |
| 6,380,660 B1 * | 4/2002 | Maeno et al. ........... 310/323.02 |

FOREIGN PATENT DOCUMENTS

| | | |
|---|---|---|
| EP | 0 923 144 | 6/1999 |
| JP | 11-220891 | 8/1999 |

* cited by examiner

*Primary Examiner*—Thomas M. Dougherty
*Assistant Examiner*—Karen Addison
(74) *Attorney, Agent, or Firm*—Fitzpatrick, Cella, Harper & Scinto (57) ABSTRACT

A vibration wave driving apparatus for obtaining driving force in 3D directions comprises a vibration member having a shape that is line-symmetrical with respect to two orthogonal axes, electro-mechanical energy conversion elements which can selectively excite in the vibration member three different types of bending vibrations, which each displace in a direction perpendicular to the two axes, and a driven member which is brought into contact with driving portions of the vibration member and driven by vibration excited in the vibration member.

21 Claims, 12 Drawing Sheets

VIBRATION WAVE DRIVING APPARATUS

BACKGROUND OF THE INVENTION

1. Field of the Invention

The present invention relates to a vibration wave driving apparatus which obtains driving force from vibration waves, such as ultrasonic waves.

2. Related Background Art

A vibration wave driving apparatus which obtains driving force in three degrees of freedom (3D direction) using vibration waves, such as ultrasonic waves, has been proposed. Japanese Patent Application Laid-Open No. 11-220891 discloses a vibration wave driving apparatus which can excite, in a Langevin type vibration element, in-plane expansion and contraction vibrations that displace in a longitudinal direction and two different types of out-of-plane bending vibrations that displace in a direction perpendicular to the longitudinal direction. When at least two of these three types of vibrations are excited and synthesized, the driven member can be translated or rotated in an arbitrary direction.

Although vibration wave driving apparatuses are required to be reduced in size and improved in function, the vibration wave driving apparatus disclosed in Japanese Patent Application Laid-Open No. 11-220891 is subject to constraints in terms of a reduction in size in the longitudinal direction because in-plane expansion and contraction vibrations that displace in the longitudinal direction of the vibration element must be generated. As the size in the longitudinal direction decreases, the frequency of in-plane expansion and contraction vibrations increases. For this reason, to decrease this frequency to a practical frequency, a certain size must be ensured in the longitudinal direction.

A vibration wave driving apparatus whose size in the longitudinal direction is reduced is disclosed in U.S. Pat. No. 5,917,268. This apparatus is designed to generate driving force in two degrees of freedom by exciting two types of in-plane expansion and contraction motions and natural modes of two types of out-of-plane bending vibrations in a planar type vibration element. More specifically, the driven member is translated or driven in the first direction by synthesizing a first in-plane expansion and contraction motion and third out-of-plane bending vibration. The driven member is translated or driven in the second direction by synthesizing second in-plane expansion and contraction motion and fourth out-of-plane vibration.

This vibration wave driving apparatus is, however, designed to generate driving force in two degrees of freedom, but there is no suggestion about an arrangement for generating driving force in three degrees of freedom. In addition, since two types of in-plane expansion and contraction motions must be generated, this apparatus is subject to constraints in terms of a reduction in size in the longitudinal direction of the plate in order to suppress the frequency of vibrations. Therefore, the technical idea of this apparatus differs from that of the present invention, i.e., obtaining driving force in three degrees of freedom and reducing the size in the longitudinal direction.

SUMMARY OF THE INVENTION

According to one aspect of this invention, there is provided a vibration wave driving apparatus which drives a driven member by vibrations excited in a vibration member having electro-mechanical energy conversion elements, wherein the vibration member has a shape line symmetrical with respect to two planes orthogonal to each other, and the electro-mechanical energy conversion elements can excite in the vibration member three different types of bending vibrations which displace in a direction of axis common to two planes.

This vibration wave driving apparatus can drive the driven member in an arbitrary direction in three dimensions by selectively exciting two of the three types of bending vibrations.

Since three types of bending vibrations that displace in the same direction are excited, the vibration member may have a plate-like shape and can be formed thin. In addition, since all the vibrations excited by the electromechanical energy conversion elements are bending vibrations, the natural vibration frequency can be suppressed low as compared with expansion and contraction vibrations. This makes it possible to reduce the size of the vibration wave driving apparatus.

Note that two of the three different types of bending vibrations have the same vibration pattern and are 90° out of phase in the same plane.

The electromechanical energy conversion elements capable of exciting the three types of bending vibrations are preferably arranged in the same plane.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
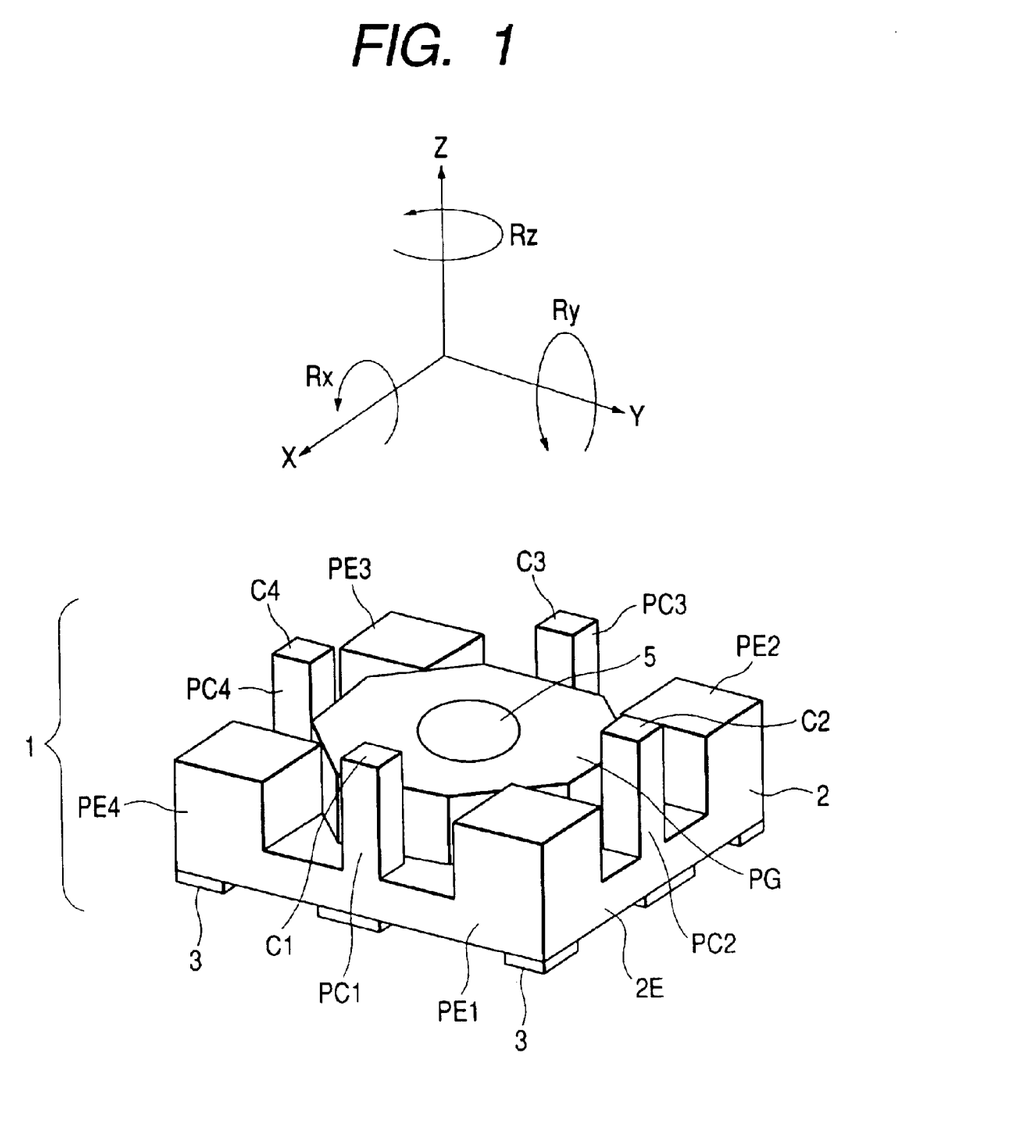
FIG. 1 is a perspective view showing a vibration element according to an embodiment of the present invention.
Figure 2:
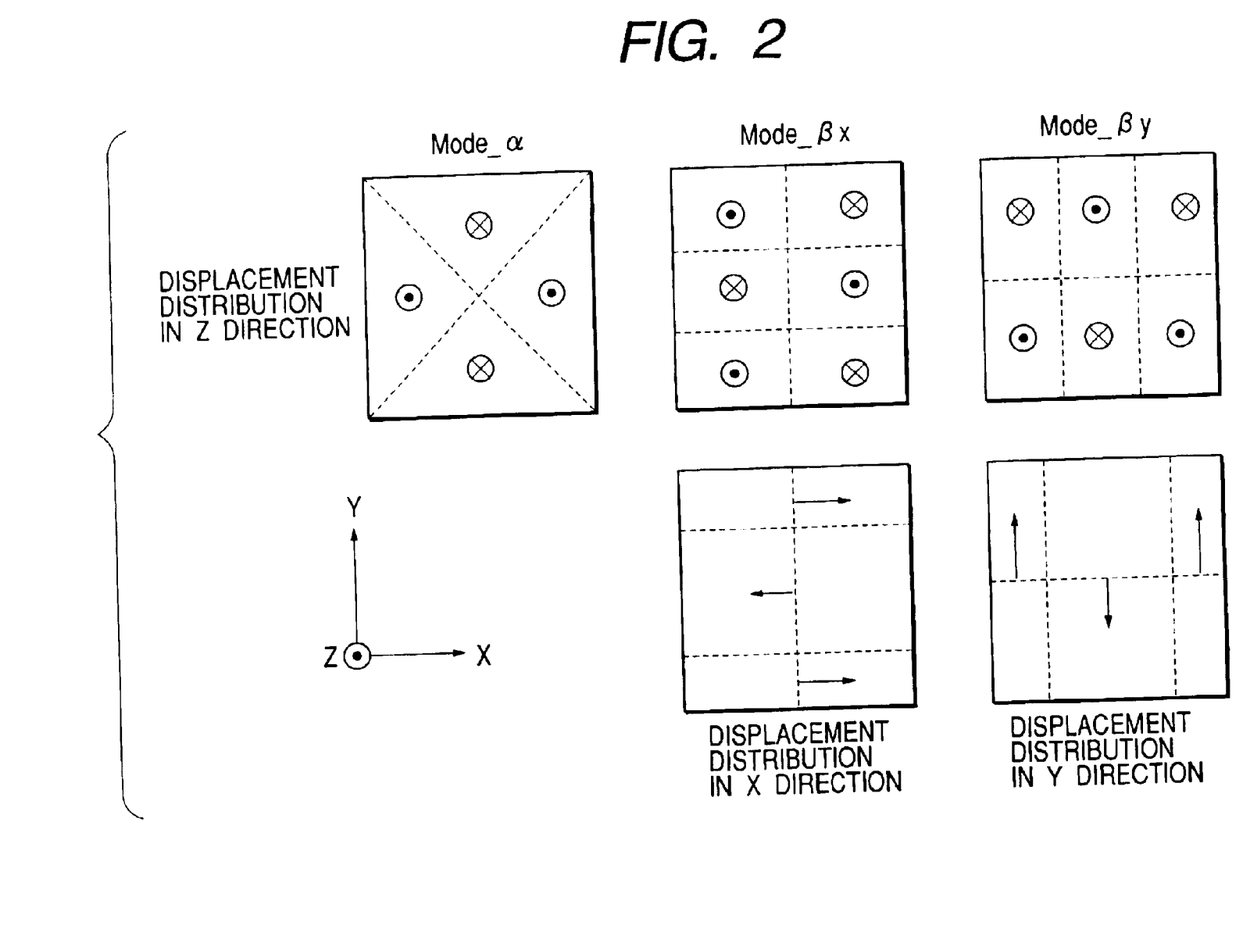
FIG. 2 is a schematic view showing the natural vibration modes excited by the vibration element in FIG. 1.

FIG. 1 is a perspective view of a vibration element 1 according to an embodiment of the present invention. FIG. 2 is a schematic view showing the natural vibration modes excited by the vibration element 1 according to this embodiment. The arrows in FIG. 2 indicate the relative positional displacements of the respective natural modes.

The vibration element 1 is comprised of a vibration member 2 shaped such that a plurality of projections are formed on a surface of a substantially square plate made of a metal, such as phosphor bronze, and piezoelectric elements 3, which are bonded and fixed to the vibration member 2 and serve as electro-mechanical energy conversion elements. Contact projections PC1 to PC4 (to be described later) are formed at four substantially middle positions on the outer sides of the vibration element 1. The contact projections PC1 to PC4 protrude in the Z-axis direction to come into contact with a driven member (not shown) so as to transfer driving force to the driven member. These contact projections PC1 to PC4 respectively have driving points C1 to C4, on their end faces, which serve to transfer driving force to the driven member. Wear-resistant members, which are made of SUS or the like and have undergone a surface oxidation process, are integrally attached to the driving points C1 to C4 with an adhesive or the like. Projections PE1 to PE4 are formed at four substantially corner positions of the vibration element 1. A projection PG is formed on a substantially central portion of the vibration element 1. A pressurizing magnet 5 for attracting or pressurizing the driven member (not shown) is placed on the central portion of the vibration member 2.

Assume that two axes which are substantially parallel to the square-plate-like surface of the vibration element 1 and perpendicular to each other are the X- and Y-axes, and an axis which is perpendicular to both the X- and Y-axes is the Z-axis. The vibration element 1 is formed to have a line symmetrical shape with respect to the X-Z plane and Y-Z plane as central.

In this embodiment, as shown in FIG. 2, vibration modes Mode_$\alpha$, Mode_$\beta$x, and Mode_$\beta$y are natural vibration modes that cause out-of-plane deformation in the X-Y plane (vibration displacements in the Z-axis direction) of the vibration element 1. Of Mode_$\alpha$, Mode_$\beta$x, and Mode_$\beta$y, Mode_$\beta$x and Mode_$\beta$y having the same waveform pattern are referred to as equal-root mode vibrations. Mode_$\beta$x and Mode_$\beta$y have the same waveform pattern and are overlaid on each other in the X-Y plane with a phase shift of 90°.

Mode_$\beta$x in FIG. 2 has three antinodes (two nodes) in the Y-axis direction and two antinodes (one node) in the X-axis direction. When Mode_$\beta$x and Mode_$\beta$y with a phase shift of 90° are overlaid on each other, nodes of Mode_$\beta$x overlay antinodes of Mode_$\beta$y at some positions, and antinodes of Mode_$\beta$x overlay nodes of Mode_$\beta$y at some positions. The contact projections PC1 to PC4 are formed at these positions.

Assume that driving currents having the same waveform are applied to the piezoelectric elements 3 respectively corresponding to the Mode_$\beta$x and Mode_$\beta$y to excite Mode_$\beta$x and Mode_$\beta$y. Even in this case, if the shape of the vibration element 1 itself is not uniform, the vibration patterns are affected by the shape of the vibration element 1 to result in an offset.

The vibration element 1 is therefore preferably formed to be line symmetrical with respect to the X-Z plane and Y-Z plane which are perpendicular to each other to prevent an offset between the respective vibration patterns due to the shape of the vibration element 1 when driving currents are applied to the piezoelectric elements 3 to generate vibrations in the same pattern.

In Mode_$\beta$x and Mode_$\beta$y in FIG. 2, the piezoelectric elements for exciting vibrations in the same vibration pattern are arranged with a phase shift of 90°. If the shape of the vibration element 1 is line symmetrical with respect to the X-Z plane and Y-Z plane as central and equal in size in the X-axis direction and Y-axis direction, the resultant natural vibration frequencies coincide with each other. Note that in this embodiment, Mode_$\beta$x and Mode_$\beta$y are excited by common piezoelectric elements.

Mode_$\alpha$ in FIG. 2 is common to Mode_$\beta$x and Mode_$\beta$y in terms of out-of-plane vibrations, but differs from them in their vibration patterns. In most cases, therefore, the natural vibration frequency of Mode_$\alpha$ differs from that of Mode_$\beta$x and Mode_$\beta$y. It is therefore necessary to match the natural vibration frequency of Mode_$\alpha$ with that of Mode_$\beta$x and Mode_$\beta$y. As is obvious from FIG. 2, in this embodiment, out-of-plane vibrations in Mode_$\beta$x and Mode_$\beta$y are shorter in wavelength than those in Mode_$\alpha$, and hence the natural vibration frequency of Mode_$\beta$x and Mode_$\beta$y is higher than that of Mode_$\alpha$. For this reason, the projections PE1 to PE4 are formed at the four substantially corner positions where the vibration amplitude of Mode_$\beta$x and Mode_$\beta$y is relatively large, so as to increase the mass, thereby suppressing the natural vibration frequency of Mode_$\beta$x and Mode_$\beta$y and matching it with the natural vibration frequency of Mode_$\alpha$. By forming these projections PE1 to PE4, the vibration displacements of the driving points C1 to C4 can be increased.

Figure 3:
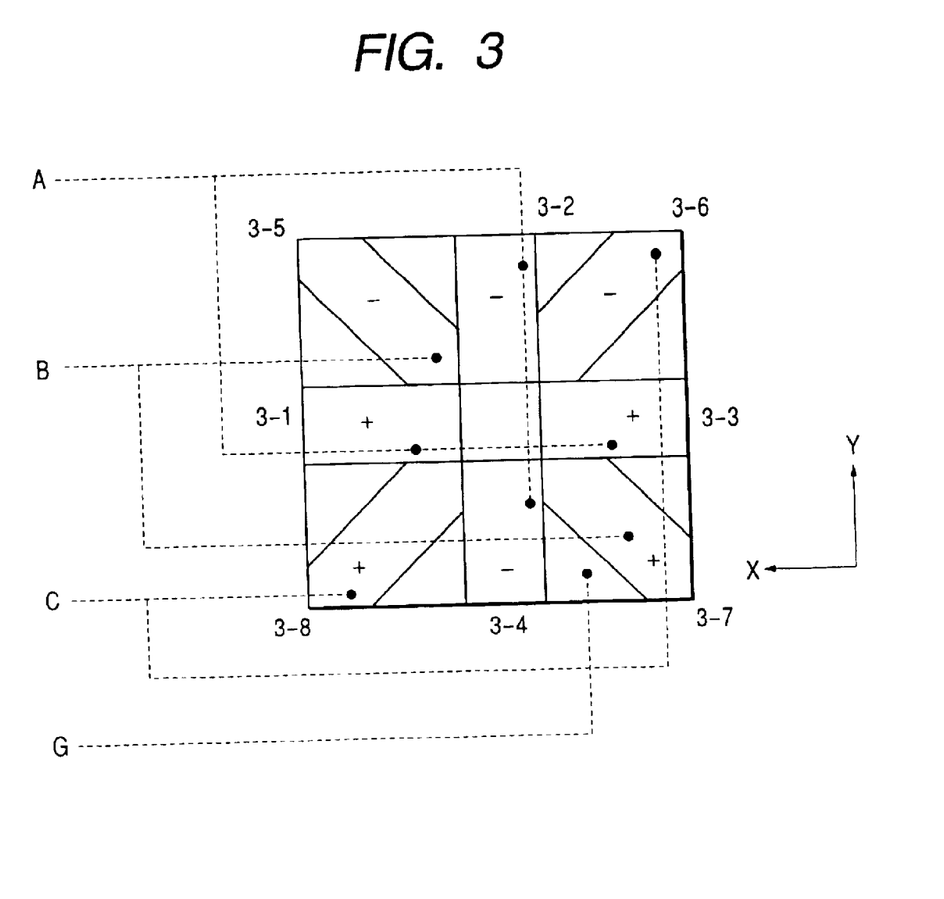
FIG. 3 is a view showing the arrangement of the piezoelectric elements of the vibration element in FIG. 1 and a connected state.

FIG. 3 shows the arrangement of piezoelectric elements 3-1 to 3-8 which are arranged on the back surface of the vibration member 2 to excite natural vibration modes Mode_$\alpha$, Mode_$\beta$x, and Mode_$\beta$y in the vibration element 1. In the vibration element 1 shown in FIG. 1, the piezoelectric elements 3-1 to 3-8 are arranged in the same plane without overlapping.

Referring to FIG. 3, (+) and (−) indicate the polarization directions of the respective piezoelectric elements 3. Terminals A, B, and C and the lines connecting them to the respective piezoelectric elements 3 schematically show application terminals for driving vibrations and a connected state. "G" connected to the vibration member 2 indicates a common potential. When an alternating signal is applied to the terminal A, Mode_$\alpha$ is excited. When alternating signals with opposite phases are applied to the terminals B and C, Mode_$\beta$x is excited. When alternating signals in phase are applied to the terminals B and C, Mode_$\beta$y is excited. Mode_$\beta$x and Mode_$\beta$y, which are equal-root-mode vibrations, are excited on the common piezoelectric elements.

Figure 4A:
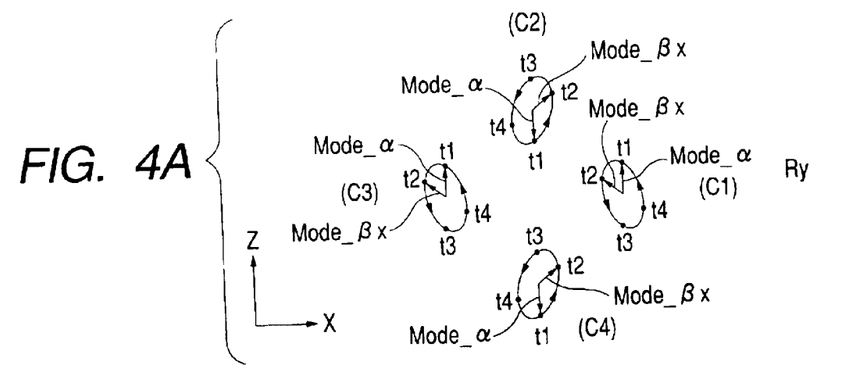
FIGS. 4A, 4B and 4C are views showing the behaviors of driving points of the vibration element in FIG. 1.
Figure 4B:
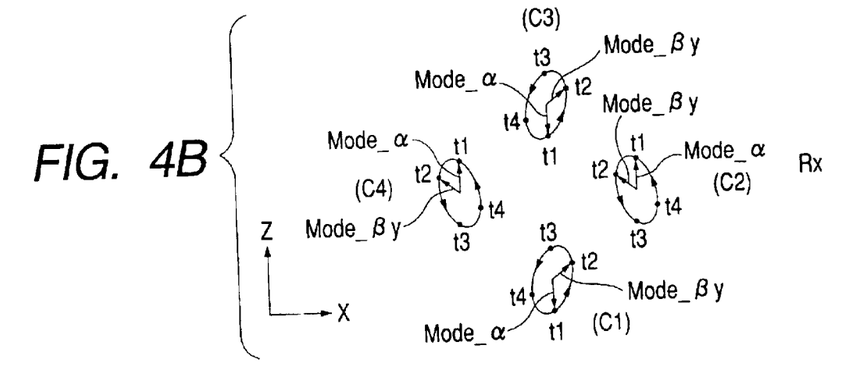
Figure 4C:
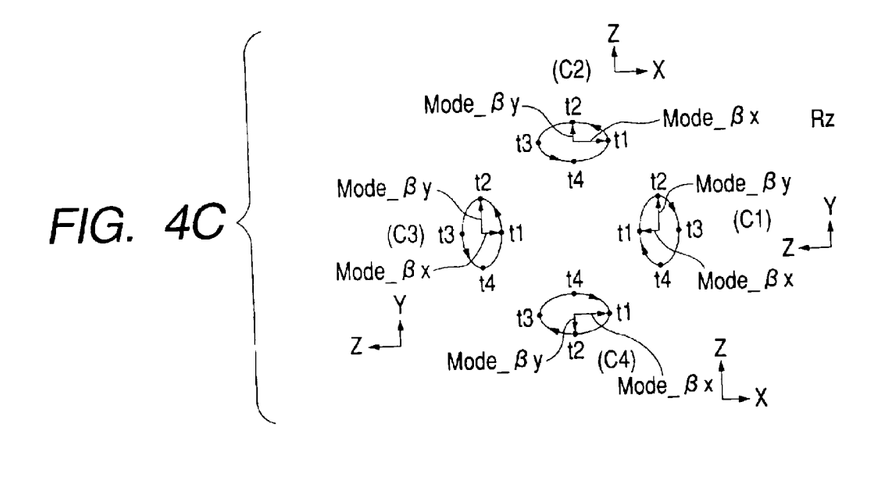

FIGS. 4A to 4C show vibration displacement states at the driving points C1 to C4.

FIG. 4A shows a vibration displacement state in which a rotation motion about the Y-axis (Ry in FIG. 1) or a translational motion in the X-axis direction is produced as a relative motion of the vibration element 1 and driven member. Driving signals are applied such that a phase of Mode_$\beta$x is delayed from that of Mode_$\alpha$, as the base phase, by $\pi/2$. The vibration displacements at the respective driving points C1 to C4 repeat temporal changes as indicated by "t1→t2→t3→t4→t1" to produce a circular or elliptic motion in the X-Y plane. With this circular or elliptic motion, a relative motion of the driven member, which is brought into contact with the driving points C1 to C4 under pressure, and the vibration element 1 can be produced. When the vibration element 1 is viewed in the Y-axis direction from the driving point C4 side in FIG. 1, all the driving points C1 to C4 are rotating counterclockwise, with the points C1 and C3 undergoing the same rotational motion and the points C2 and C4 undergoing the same rotational motion. The rotation of the points C1 and C3 is $\lambda/2$ out of phase from the rotation of the points C2 and C4. The points C1 and C3 and the points C2 and C4 alternately come into contact with the driven member. Obviously, when driving signals are applied such that a phase of Mode_$\beta$x temporarily goes ahead of that of Mode_$\beta$x, as the base phase, by $\pi/2$, the driving points rotate clockwise.

Figure 5:
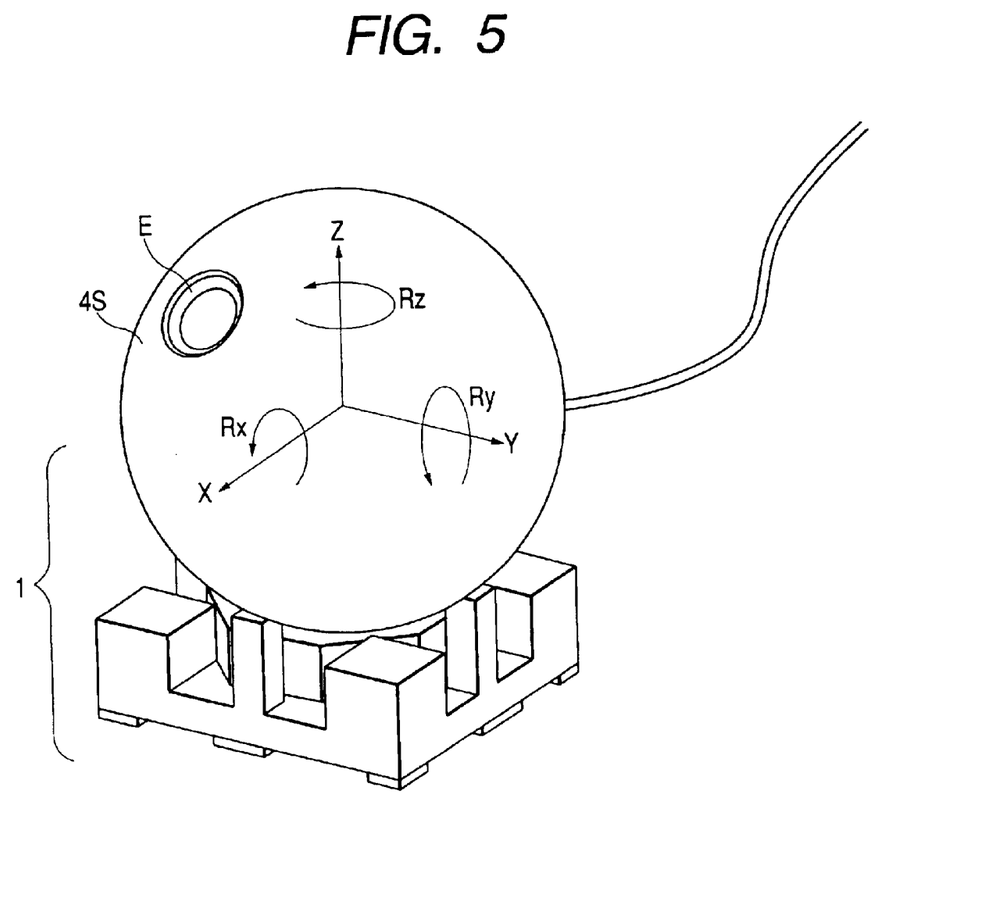
FIG. 5 is a view showing a vibration wave driving apparatus using the vibration element in FIG. 1 and a spherical driven member.
Figure 6A:
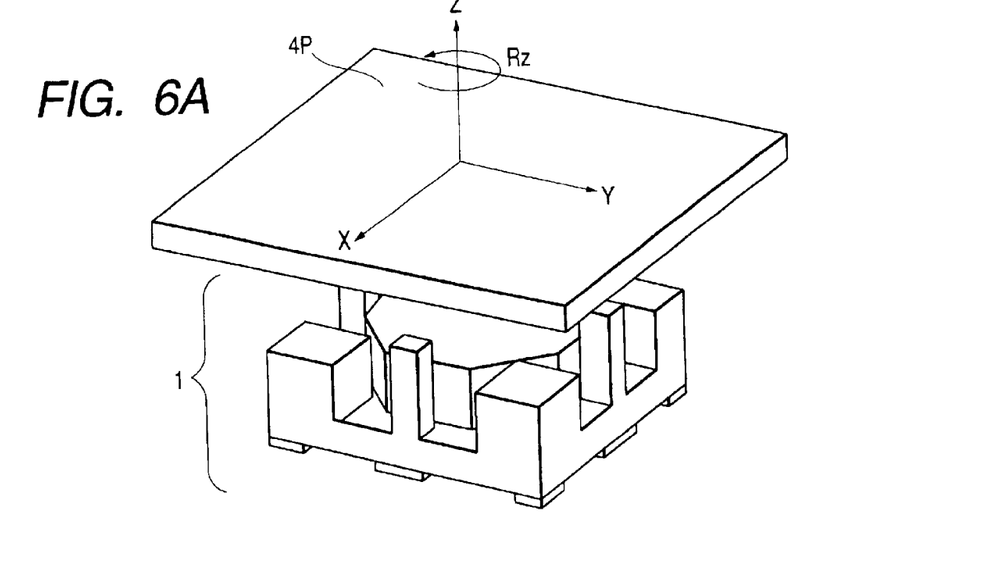
FIGS. 6A and 6B are perspective views showing a vibration wave driving apparatus using the vibration element in FIG. 1, and a plate-like driven member or elliptic driven member.

If, for example, a spherical driven member 4S is selected, as shown in FIG. 5, and the vibration element 1 is fixed and supported, the driven member 4S rotates about the Y-axis (Ry). If a flat plate-like driven member 4P is selected, as shown in FIG. 6A, and the vibration element 1 is fixed and supported, the driven member 4P translates in the X-axis direction.

FIG. 4B shows a vibration displacement state in which a rotational motion about the X-axis (Rx), or a translational motion in the Y-axis direction, is produced as a relative motion of the vibration element 1 and driven member. Driving signals are applied such that a phase of Mode_$\beta$y is delayed from that of Mode_$\alpha$, as the base phase, by $\pi/2$. As in the case of Mode_$\alpha$ and Mode_$\beta$x, elliptic motions are produced at the driving points C1 to C4 in the Y-Z plane. When the vibration element 1 is viewed in the X-axis direction from the driving point C1 side in FIG. 1, all the driving points C1 to C4 are rotating counterclockwise, with the points C1 and C3 undergoing the same rotational motion and the points C2 and C4 undergoing the same rotational motion. The rotation of the points C1 and C3 is $\lambda/2$ out of phase from the rotation of the points C2 and C4. The points C1 and C3 and the points C2 and C4 alternately come into contact with the driven member.

If the spherical driven member 4S is selected, as shown in FIG. 5, and the vibration element 1 is fixed and supported, the driven member 4S rotates about the X-axis (Rx). If the flat driven member 4P is selected, as shown in FIG. 6A, and the vibration element 1 is fixed and supported, the driven member 4P translates in the Y-axis direction.

FIG. 4C shows a vibration displacement state in which a rotational motion about the Z-axis (Rz) is produced as a relative motion of the vibration element 1 and driven member. Driving signals are applied such that a phase of Mode_$\beta$y is delayed from that of Mode_$\beta$x, as the base phase, by $\pi/2$. Elliptic motions are produced at the driving points C1 to C4 in the X-Y plane. FIGS. 4A and 4B show the vibration displacements at the respective driving points in the same plane. In contrast to this, FIG. 4C shows the vibration displacements at the driving points C1 and C3 in the Y-Z plane, and the vibration displacements at the driving points C2 and C4 in the X-Z plane. When the vibration element 1 is viewed in the X-axis direction from the driving point C1 side in FIG. 1, the driving point C1 is rotating clockwise. When the vibration element 1 is viewed in the Y-axis direction from the driving point C2 side, the driving point C2 is rotating clockwise. When the vibration element 1 is viewed in the X-axis direction from the driving point C3 side, the driving point C3 is rotating clockwise. When the vibration element 1 is viewed in the Y-axis direction from the driving point C4 side, the driving point C4 is rotating clockwise. Since the rotational motions of the driving points C1 to C4 are $\lambda/4$ out of phase from each other, the driven member sequentially comes into contact with the driving points C1 to C4.

If, therefore, a spherical driven member 4S is selected, as shown in FIG. 5, and the vibration element 1 is fixed and supported, the driven member 4S rotates about the Z-axis (Rz). If a flat driven member 4P is selected, as shown in FIG. 6A, and the vibration element 1 is fixed and supported, a relative rotational motion about the Z-axis (Rz) can be produced between the driven member 4P and the vibration element 1.

Figure 6B:
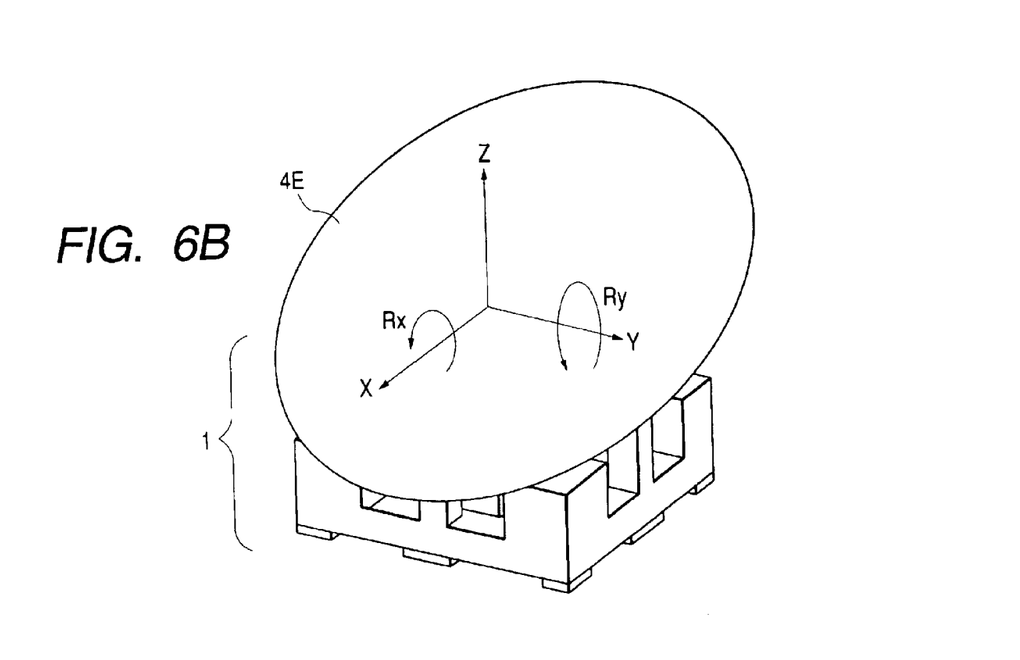

Although the motions in the respective axial directions and about the respective axes have been separately described above, driving forces can be generated in arbitrary directions by combining the respective natural vibration modes. When an elliptic driven member 4E is selected, as shown in FIG. 6B, and the vibration element 1 is fixed and supported, driving forces can be generated in the driven member to rotate it about the X-axis (Rx) and Y-axis (Ry) or a combination of these forces can be produced to move it in an arbitrary direction. If a driven member having a curved surface is used, the member can be driven about an arbitrary axis.

The spherical driven member 4S in FIG. 5 may be a CCD camera. That is, FIG. 5 shows an example of how the vibration wave driving apparatus according to this embodiment may be applied to a positioning mechanism for a CCD camera. A CCD camera E is incorporated in the spherical driven member 4S. The CCD camera E can be positioned in an arbitrary direction by the driving force generated by the vibration element 1.

Figure 7A:
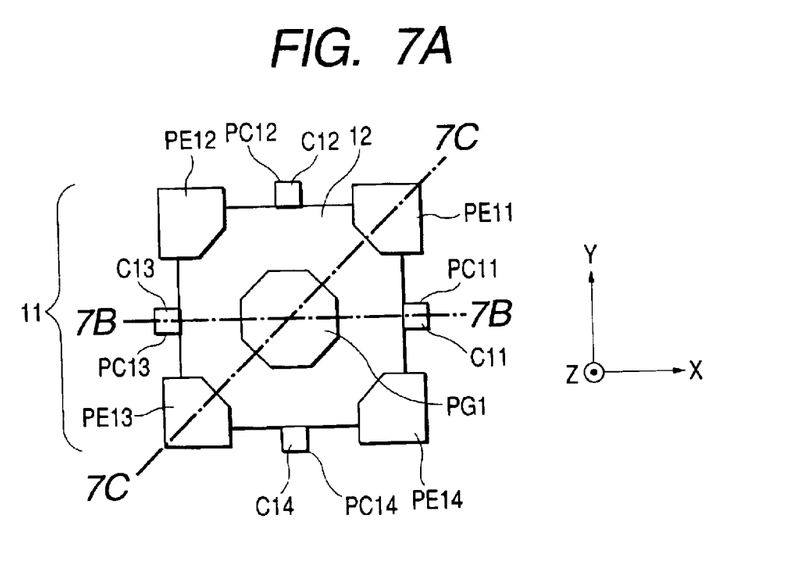
FIGS. 7A, 7B and 7C are views showing a modification of the vibration element in FIG. 1.
Figure 7B:
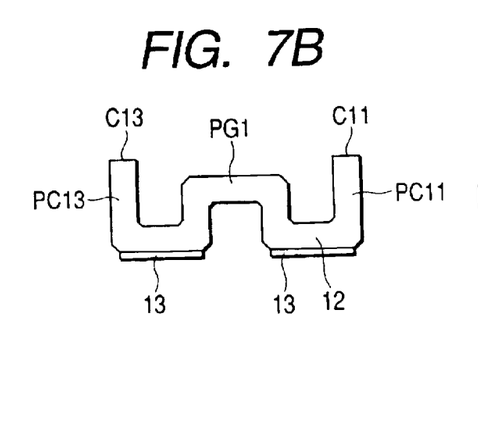
Figure 7C:
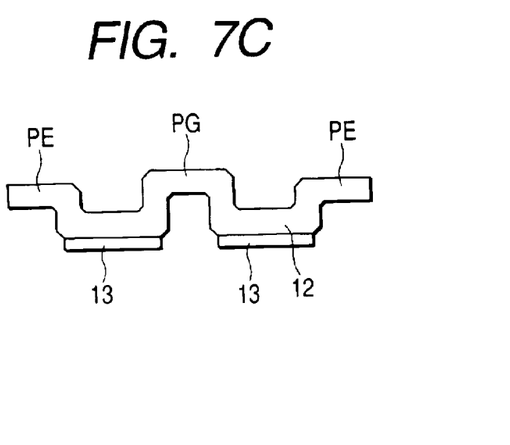

FIGS. 7A to 7C show another arrangement of a vibration element 11 according to this embodiment. FIG. 7A is a plan view. FIG. 7B is a sectional view taken along a line 7B—7B in FIG. 7A. FIG. 7C is a sectional view taken along a line 7C—7C in FIG. 7A.

A vibration member 12, as a part of the vibration element 11, is formed by pressing using an iron-based plate member. The vibration element 11 is comprised of the vibration member 12 and piezoelectric elements 13, as in the case of the vibration element 1 in FIG. 1. The forms of natural vibration modes excited in the vibration element 11 are also the same as those in FIG. 2. Contact projections PC11 to PC14 have driving points C11 to C14 at their distal ends. The contact projections PC11 to PC14 protrude in the Z-axis direction and also protrude outward in the X-Y plane. This arrangement makes it possible to enhance the displacements of the driving points C11 to C14. Likewise, projections PE11 to PE14 protrude in the Z-axis direction and also protrude outward in the X-Y plane, and serve to increase the mass at four substantially corner positions where the vibration amplitudes of Mode_$\beta$x and Mode_$\beta$y are relatively large, thereby matching the natural vibration frequencies of Mode_$\alpha$, Mode_$\beta$x, and Mode_$\beta$y with each other.

Figure 8A:
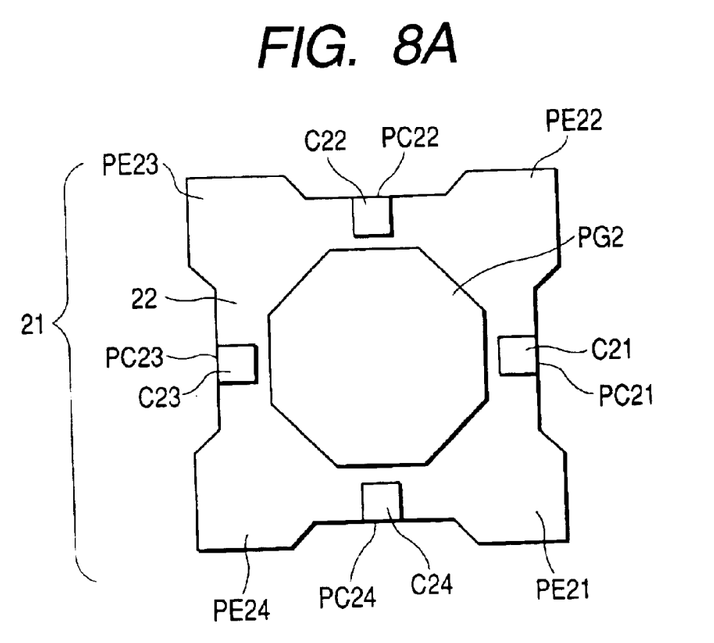
FIGS. 8A and 8B are views showing another modification of the vibration element in FIG. 1.
Figure 8B:
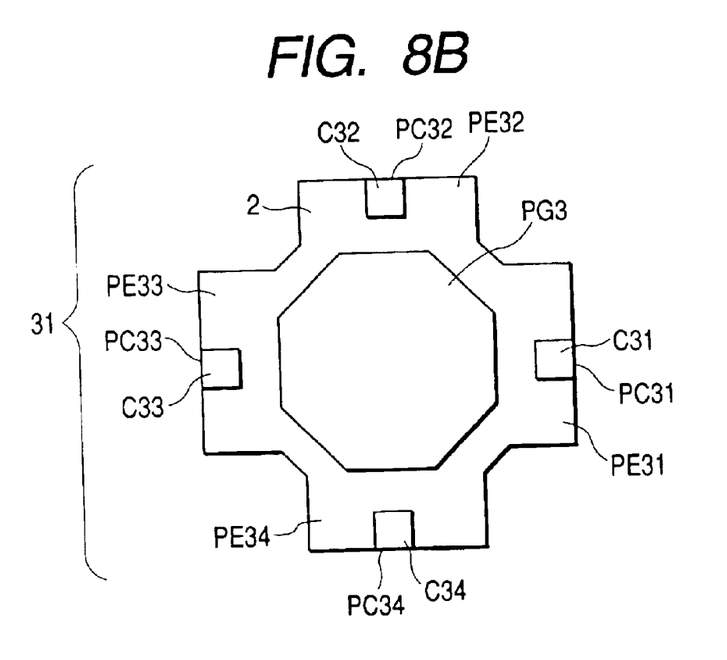
Figure 9:
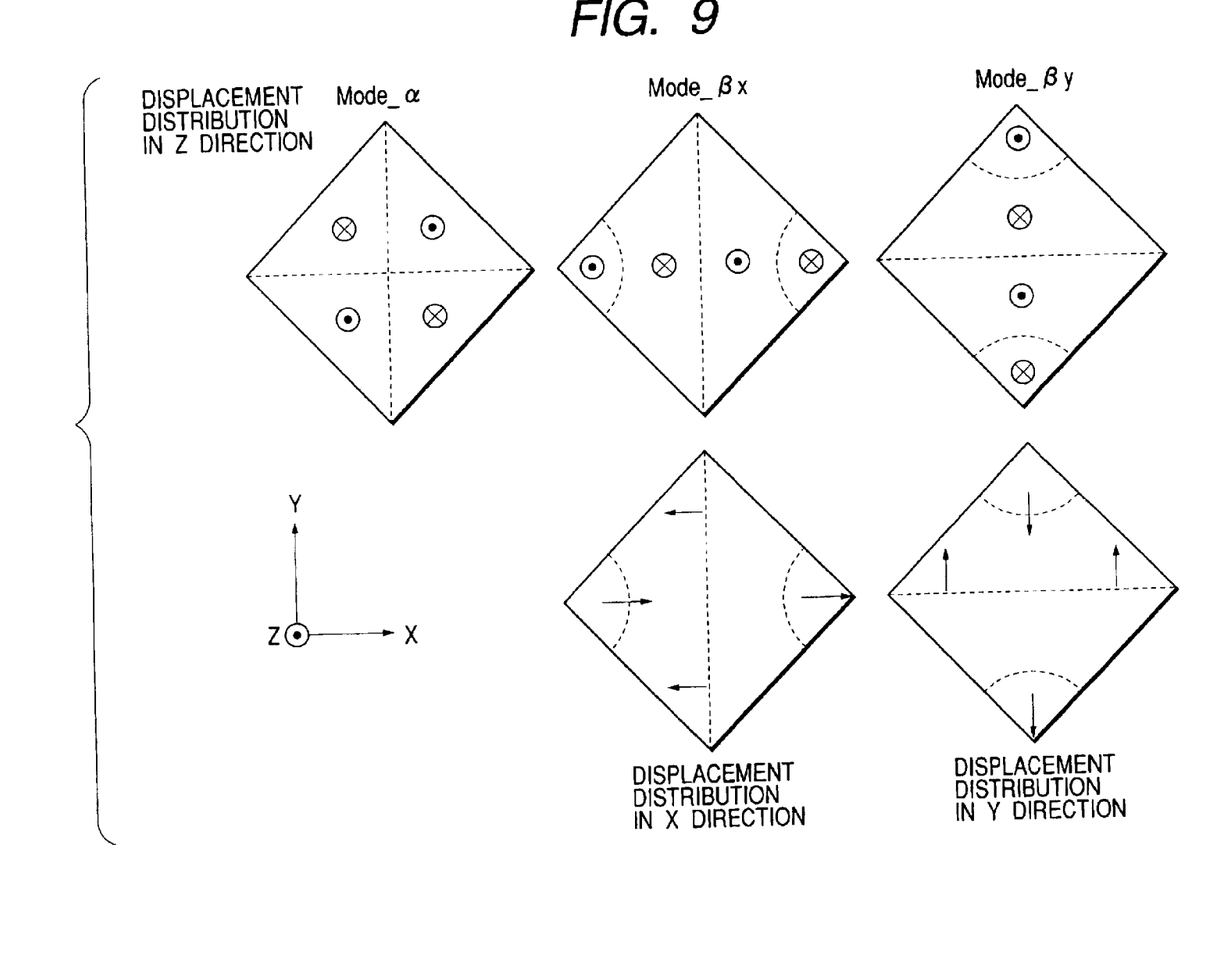
FIG. 9 is a schematic view showing other natural vibration modes that can be excited in the vibration element in FIG. 1.

The shape of the vibration element 1 is not limited to this. As other shapes that obtain the effects of the present invention, for example, the shapes of vibration elements 21 and 31 shown in FIGS. 8A and 8B may be used. The natural vibration modes excited by the vibration element 21 are not limited to the above modes. For example, the same driving operation as that described above can be performed using the natural vibration modes shown in FIG. 9.

Figure 10:
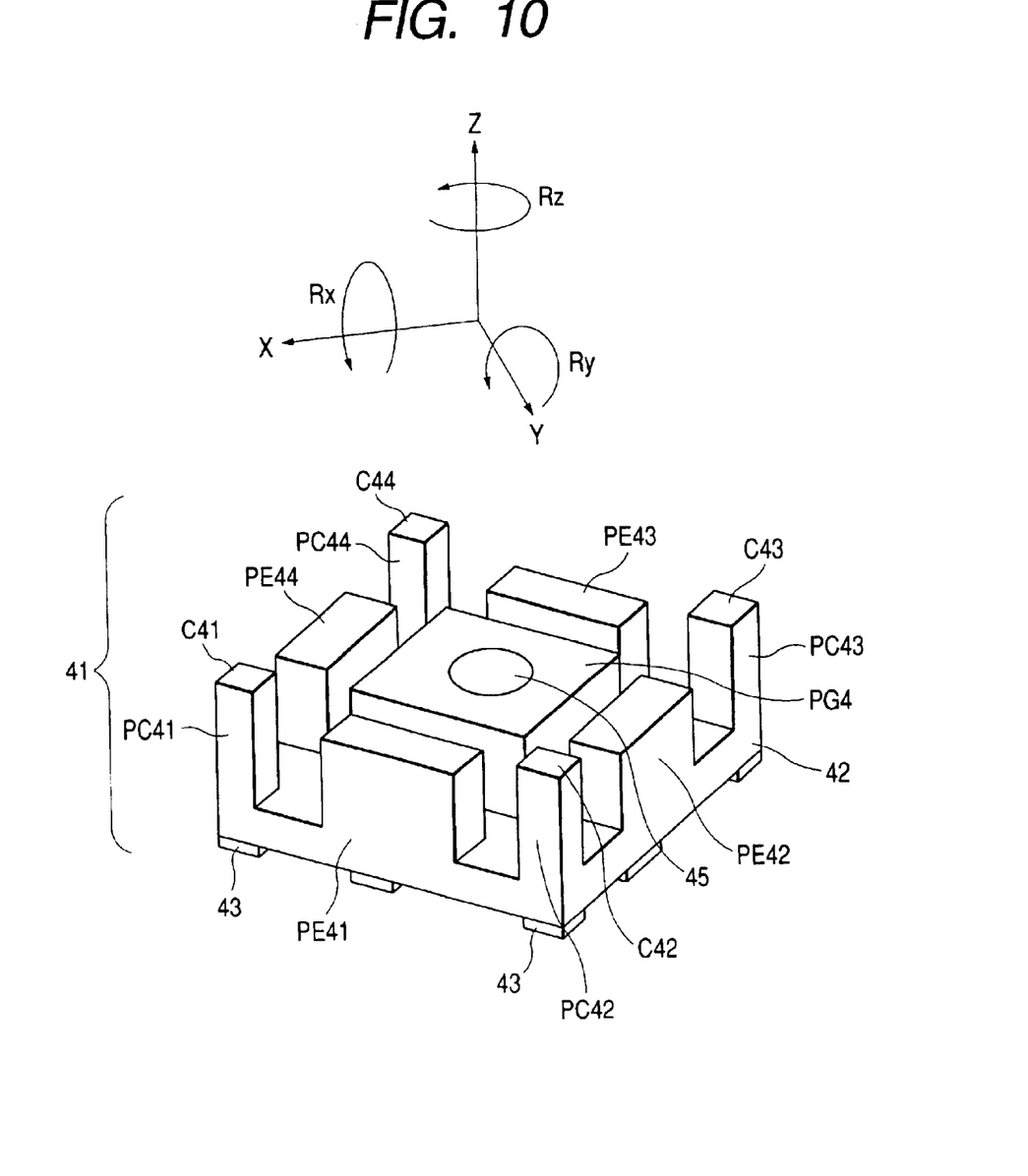
FIG. 10 is a perspective view showing a vibration element according to another embodiment of the present invention.
Figure 11:
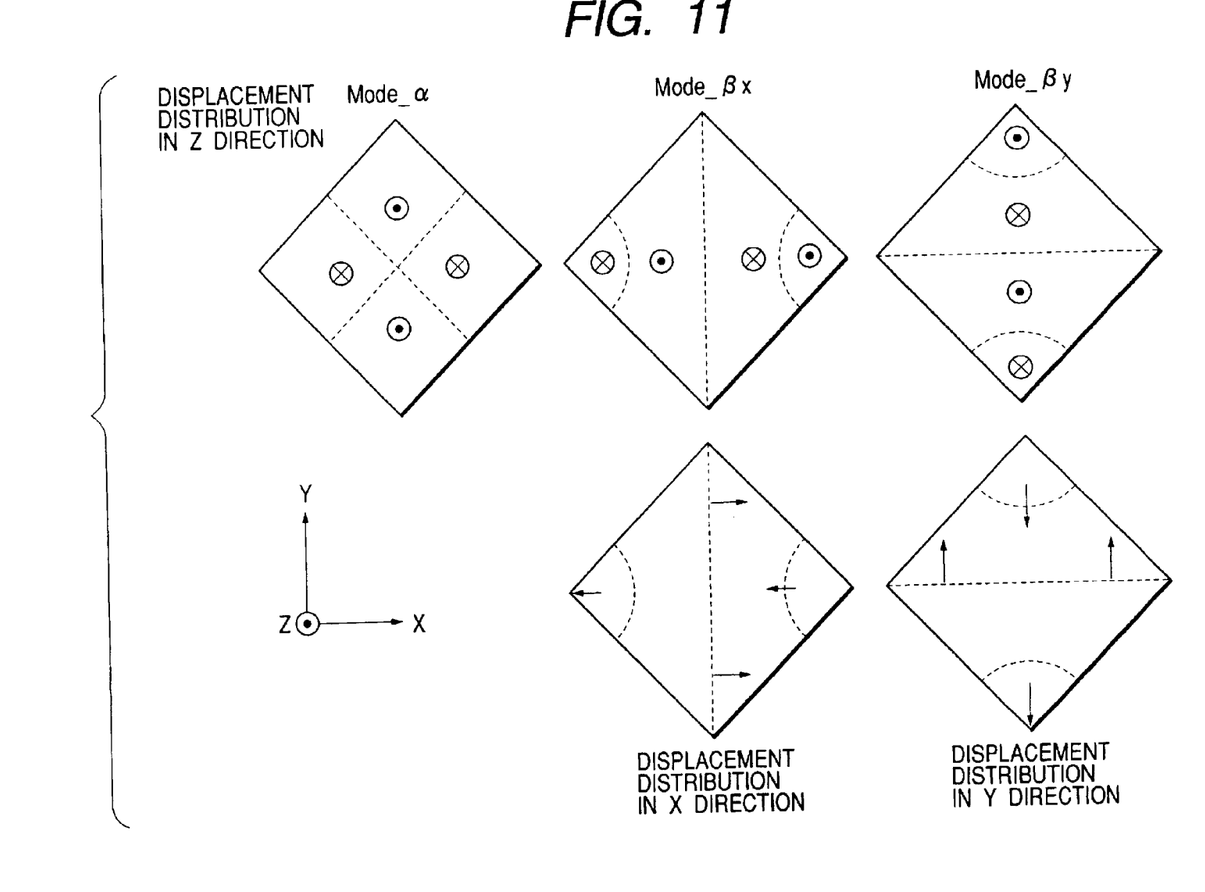
FIG. 11 is a schematic view showing the natural vibration modes excited by the vibration element in FIG. 10.

FIG. 10 is a perspective view showing a vibration element 41 according to another embodiment of the present invention. FIG. 11 is a schematic view showing the natural vibration modes excited by the vibration element 41. The arrows in FIG. 11 indicate the relative displacements of the respective natural vibration modes.

This vibration element differs from the one shown in FIG. 1 in that contact projections PC41 to PC44 are formed at four substantially corner positions of the vibration element 41, and projections PE41 to PE44 are formed at substantially middle positions on the outer sides of the vibration element 41. In this embodiment, since natural vibration modes having vibrations with the patterns shown in FIG. 11 are generated, the vibration element is formed into a shape that can efficiently excite these natural vibration modes. More specifically, the vibration element 41 is formed to be line symmetrical with respect to the X-Z plane and Y-Z plane as central. In order to suppress the natural frequency of Mode_βx and Mode_βy so as to match it with the natural frequency of Mode_α, the projections PE41 to PE44 are formed at the four substantially middle positions on the outer sides where the vibration amplitude of Mode_βx and Mode_βy is relatively large, so as to increase the mass.

Figure 12:
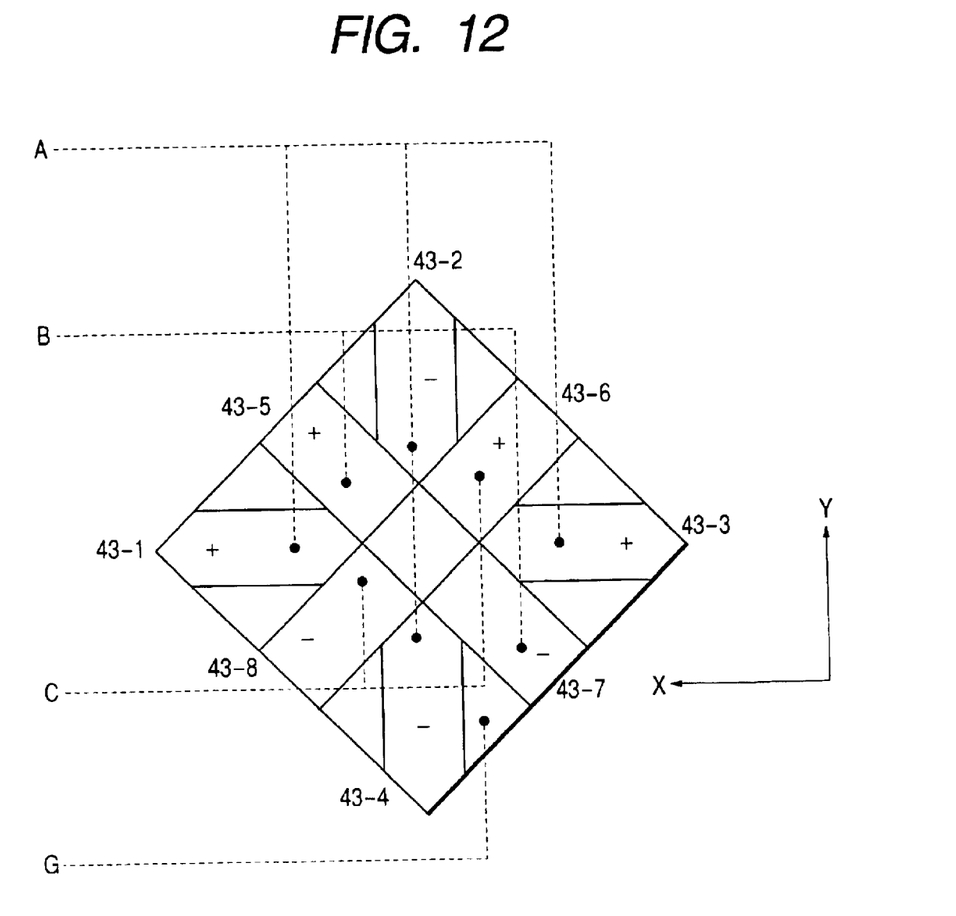
FIG. 12 is a view showing the arrangement of the piezoelectric elements of the vibration element in FIG. 10 and a connected state.

FIG. 12 shows the arrangement of piezoelectric elements 43-1 to 43-8 which are arranged on the back surface of a vibration member 42 to excite the natural vibration modes Mode_α, Mode_βx, and Mode_βy in the vibration element 41.

Referring to FIG. 12, (+) and (−) indicate the polarization directions of the respective piezoelectric elements 43. Terminals A, B, and C and the lines connecting them and the respective piezoelectric elements 43 schematically show application terminals for driving vibrations and a connected state. "G" connected to the vibration member 42 indicates a common potential. When an alternating signal is applied to the terminal A, vibration having Mode_α is excited. When alternating signals with opposite phases are applied to the terminals B and C, vibration having Mode_βx is excited. When alternating signals in phase are applied to the terminals B and C, vibration having Mode_βy is excited. In this embodiment as well, Mode_βx and Mode_βy which are equal-root-mode vibrations are excited by the common piezoelectric elements. Other arrangements are the same as those of the vibration element in FIG. 1.

The vibration element shown in FIG. 10 differs from the one shown in FIG. 1 only in the vibration patterns of natural vibration modes, but is based on the same driving principle.

When driving signals are applied such that a phase of Mode_βx is delayed from that of Mode_α, as the base phase, by $\pi/2$, a rotational motion about Y-axis (Ry) or a translational motion in the X-axis direction is produced as a relative motion of the vibration element 1 and driven member. When driving signals are applied such that a phase of Mode_βy is delayed from that of Mode_α, as the base phase, by $\pi/2$, a rotation about the X-axis (Rx) or a translational motion in the Y-axis direction is produced as a relative motion of the vibration element 1 and driven member. When driving signals are applied such that a phase of Mode_βy is delayed from that of Mode_βx, as the base phase, by $\pi/2$, a rotational motion about the Z-axis (Rz) is produced as a relative motion of the vibration element 1 and driven member.

What is claimed is:

1. A vibration wave driving apparatus comprising:
a vibration member having a shape that is line-symmetrical with respect to two orthogonal planes;
electro-mechanical energy conversion elements which selectively excite in said vibration member three different types of bending vibrations, each of which respectively displaces in a direction in parallel with the two orthogonal planes; and
a driven member which is brought into contact with driving portions of said vibration member and driven by vibrations excited in said vibration member.

2. An apparatus according to claim 1, wherein said electro-mechanical energy conversion elements which can excite the three types of bending vibrations are arranged in the same plane.

3. An apparatus according to claim 1, wherein said vibration wave driving apparatus drives said driven member in an arbitrary direction in three dimensions by selecting and exciting two of the three types of bending vibrations.

4. An apparatus according to claim 1, wherein the driving portions of said vibration member protrude from said vibration member in a direction in which the three types of bending vibrations displace.

5. An apparatus according to claim 1, wherein two of the three types of bending vibrations have the same vibration pattern and are 90° out of phase from each other in the same plane.

6. An apparatus according to claim 5, wherein one of the two types of bending vibrations has a node at which an antinode of the other bending vibration is located.

7. An apparatus according to claim 1, wherein the three types of bending vibrations have the same natural vibration frequency.

8. An apparatus according to claim 1, wherein said driven member has a curved surface that comes into contact with the driving portions of said vibration member.

9. A vibration wave driving apparatus comprising:
a vibration member formed by a plate member and projections protruding from a surface of the plate member and having a shape that is line-symmetrical with respect to two orthogonal planes;
electro-mechanical energy conversion elements which are fixed to a surface of the plate member which is opposite the surface from which the projections protrude, and selectively excite three different types of bending vibrations that displace in a direction perpendicular to the plate member; and
a driven member which comes into contact with the projections of said vibration member,
wherein synthesis of two of the three different types of bending vibrations selectively drives said driven member in an arbitrary direction in three dimensions.

10. An apparatus according to claim 9, wherein said electro-mechanical energy conversion elements are arranged in the same plane.

11. An apparatus according to claim 9, wherein two of the three types of bending vibrations have the same vibration pattern and are 90° out of phase from each other in the same plane.

12. An apparatus according to claim 11, wherein one of the two types of bending vibrations has a node at which an antinode of the other bending vibration is located.

13. An apparatus according to claim 11, wherein the two types of bending vibrations differ in vibration pattern from the remaining type of bending vibrations.

14. An apparatus according to claim 11, wherein the two types of bending vibrations are excited by said same electro-mechanical energy conversion elements.

15. An apparatus according to claim 9, wherein the three types of bending vibrations have the same natural vibration frequency.

16. An apparatus according to claim 15, wherein a mass of said vibration member is increased at a position corresponding to an antinode of one of the three different types of bending vibrations which has a short wavelength.

17. An apparatus according to claim 9, wherein said driven member has a curved surface that comes into contact with the driving portions of said vibration member.

18. An apparatus according to claim 9, wherein said vibration member has a square outer shape.

19. An apparatus according to claim 18, wherein the projections are arranged at substantially middle portions on the respective sides of the square.

20. An apparatus according to claim 18, wherein the projections are arranged at corner portions of the square.

21. A vibration wave driving apparatus comprising:

a vibration member which has an electro-mechanical energy conversion element; and a driven member which is in contact with the vibration member and is driven by a vibration excited on the vibration member, wherein application of alternating signals to the electro-mechanical energy conversion element generates on a surface of the vibration member three bending vibrations having the same displacement directions but mutually different node positions.

* * * * *